(12) United States Patent
Yoshida et al.

(10) Patent No.: US 11,228,217 B2
(45) Date of Patent: Jan. 18, 2022

(54) BUS BAR ASSEMBLY AND MOTOR

(71) Applicant: Nidec Corporation, Kyoto (JP)

(72) Inventors: Yusaku Yoshida, Kyoto (JP); Takao Atarashi, Kyoto (JP); Chiharu Kobayashi, Kyoto (JP); Kentaro Sato, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 134 days.

(21) Appl. No.: 16/667,984

(22) Filed: Oct. 30, 2019

(65) Prior Publication Data

US 2020/0153302 A1    May 14, 2020

(30) Foreign Application Priority Data

Nov. 14, 2018 (JP) .............................. JP2018-214214

(51) Int. Cl.
*H02K 3/18* (2006.01)
*H01R 25/16* (2006.01)
*H02K 3/52* (2006.01)

(52) U.S. Cl.
CPC ............. *H02K 3/18* (2013.01); *H01R 25/162* (2013.01); *H01R 25/167* (2013.01); *H02K 3/522* (2013.01); *H02K 2203/09* (2013.01)

(58) Field of Classification Search
CPC ....... H02K 2203/09; H02K 3/18; H02K 3/522
See application file for complete search history.

(56) References Cited

U.S. PATENT DOCUMENTS

| | | | | |
|---|---|---|---|---|
| 7,498,702 B2* | 3/2009 | Migita | ................... | H02K 3/522 310/43 |
| 8,779,641 B2* | 7/2014 | Fujii | ...................... | H02K 29/08 310/71 |
| 10,218,241 B2* | 2/2019 | Nakamura | ........... | B62D 5/0457 |
| 10,404,125 B2* | 9/2019 | Nakahara | ................ | H02K 3/04 |
| 10,862,363 B2* | 12/2020 | Ogawa | .................... | H02K 3/505 |
| 10,868,410 B2* | 12/2020 | Ogawa | ..................... | H02K 3/28 |
| 10,998,789 B2* | 5/2021 | Tategata | ................... | H02K 5/22 |
| 2003/0173841 A1* | 9/2003 | Kobayashi | ......... | H02K 15/0056 310/71 |

(Continued)

FOREIGN PATENT DOCUMENTS

| | | |
|---|---|---|
| CN | 107534343 A | 1/2018 |
| DE | 10 2016 123 479 A1 | 6/2018 |
| WO | 2013/042248 A1 | 3/2013 |

OTHER PUBLICATIONS

Official Communication issued in corresponding Chinese Patent Application No. 201911106332.7, dated Sep. 28, 2021.

*Primary Examiner* — Robert W Horn
(74) *Attorney, Agent, or Firm* — Keating & Bennett (57) ABSTRACT

A bus bar assembly includes bus bars and a bus bar holder that is made of an insulating material and holds the bus bars in a non-contact state. The bus bars include base portions that overlap with other bus bars in the axial direction, and connecting portions extending from the base portions along the radial direction. At least two of the bus bars include stepped portions extending toward the other bus bars between proximal ends of the connecting portions and connection ends connected to windings. The bus bar holder molds the base portions and the stepped portions in a state where the connection ends are exposed.

3 Claims, 8 Drawing Sheets

(56) References Cited

U.S. PATENT DOCUMENTS

| | | | |
|---|---|---|---|
| 2016/0028286 A1* | 1/2016 | Houzumi | H02K 3/521 |
| | | | 310/208 |
| 2018/0159397 A1 | 6/2018 | Houzumi et al. | |
| 2018/0316239 A1* | 11/2018 | Ogawa | H02K 11/30 |
| 2019/0036406 A1* | 1/2019 | Nakahara | H02K 3/325 |
| 2019/0348884 A1* | 11/2019 | Popa | H02K 3/522 |
| 2019/0348885 A1* | 11/2019 | Hattori | H02K 3/38 |
| 2020/0014273 A1* | 1/2020 | Ogawa | H02K 5/1732 |
| 2020/0028400 A1* | 1/2020 | Seo | H02K 15/12 |
| 2020/0106319 A1 | 4/2020 | Tategata et al. | |
| 2020/0153302 A1* | 5/2020 | Yoshida | H02K 3/522 |
| 2020/0208698 A1* | 7/2020 | Kim | F16D 65/14 |
| 2020/0220412 A1* | 7/2020 | Iwano | H02K 3/50 |
| 2020/0251954 A1* | 8/2020 | Ogawa | H02K 5/161 |
| 2020/0395809 A1* | 12/2020 | Kim | H02K 3/522 |

\* cited by examiner

BUS BAR ASSEMBLY AND MOTOR

CROSS REFERENCE TO RELATED APPLICATION

The present application claims priority under 35 U.S.C. § 119 to Japanese Application No. 2018-214214 filed on Nov. 14, 2018 the entire contents of which are hereby incorporated herein by reference.

FIELD OF THE INVENTION

The present disclosure relates to a bus bar assembly and a motor.

BACKGROUND

Conventionally, there is known a bus bar assembly that includes a plurality of bus bars connecting in-phase windings in parallel among windings wound respectively around teeth provided in a circumferential direction, the plurality of bus bars being molded with an insulating member.

The conventional bus bar assembly includes an arc-shaped bus bar module body and a bus bar end edge protruding toward radially inner and outer sides from the bus bar module body. The bus bar end edge has a part extending in a radial direction and a portion extending in an axial direction continuously to a distal end portion of the part extending in the radial direction.

In the bus bar assembly as described above, it is necessary to ensure a distance between the bus bar end edge and the winding in order to ensure insulation therebetween. Thus, a motor employing the conventional bus bar assembly is relatively large in the axial direction.

SUMMARY

A bus bar assembly of an example embodiment of the present disclosure includes at least two bus bars, and a bus bar holder that is made of an insulating material and holds the plurality of bus bars in a non-contacting state. A first of the at least two bus bars includes a base portion that overlaps with another of the at least two bus bars in an axial direction, and a connecting portion that extends from the base portion along a radial direction. At least one of the at least two bus bars includes a stepped portion extending toward another of the at least two bus bars from a proximal end to a distal end of the connecting portion. The bus bar holder is molded about the base portion and the stepped portion in a state where the distal end is exposed.

A motor of an example embodiment of the present disclosure includes the above bus bar assembly, a housing extending in an axial direction, a stator fixed to an inner circumferential surface of the housing, and a rotor positioned inside the stator. The bus bar assembly is positioned between the stator and a bearing holder, which rotatably supports the rotor with respect to the housing, in the axial direction.

According to the above configuration, it is possible to shorten an insulation distance required between the stator and the connecting portion. As a result, it is possible to reduce or prevent a size increase of the motor.

The above and other elements, features, steps, characteristics and advantages of the present disclosure will become more apparent from the following detailed description of the example embodiments with reference to the attached drawings.

DETAILED DESCRIPTION

Hereinafter, a motor 1 according to an example embodiment of the present disclosure will be described with reference to the accompanying drawings. Note that the scope of the present disclosure is not limited to the example embodiment to be described below, but includes any modification thereof within the scope of the technical idea of the present disclosure. In addition, there is a case where scales, numbers, and the like of structures illustrated in the following drawings may differ from those of actual structures, for the sake of easier understanding of the structures.

In the following description, the upper side with respect to an axis J in FIG. 3 will be referred to as "one side", and the lower side with respect to the central axis J will be referred to as "the other side". Note that the terms of the upper side and the lower side are used simply for the description, and do not limit the actual positional relation or direction. Unless otherwise explained, a direction parallel to the central axis J will be simply referred to as the "axial direction", a radial direction having its center on the central axis J will be simply referred to as the "radial direction", and a circumferential direction having its center on the central axis J, that is, the axial circumference of the central axis J, will be simply referred to as the "circumferential direction". In the following description, a "plan view" means a state viewed from the axial direction.

Hereinafter, one example embodiment of a motor used in, for example, an electric power steering device will be described with reference to the drawings.

Figure 1:
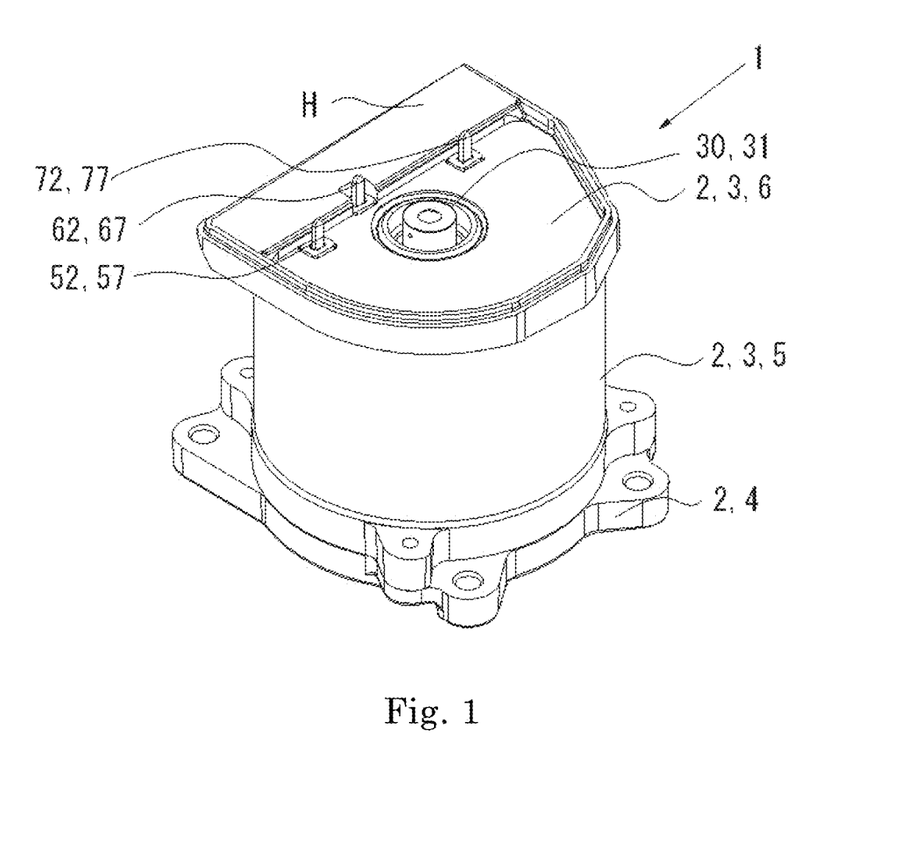
FIG. 1 is a perspective view of a motor according to an example embodiment of the present disclosure.
Figure 2:
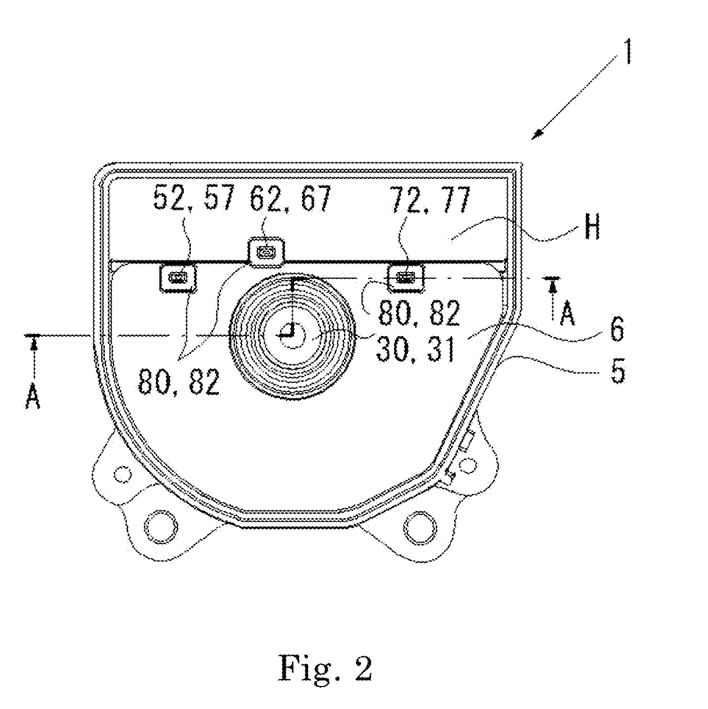
FIG. 2 is a plan view of the motor according to an example embodiment of the present disclosure as viewed from one axial side.

As illustrated in FIGS. 1 and 2, a housing 2 of the motor 1 includes a cylindrical body 3 and a lid body 4.

Figure 3:
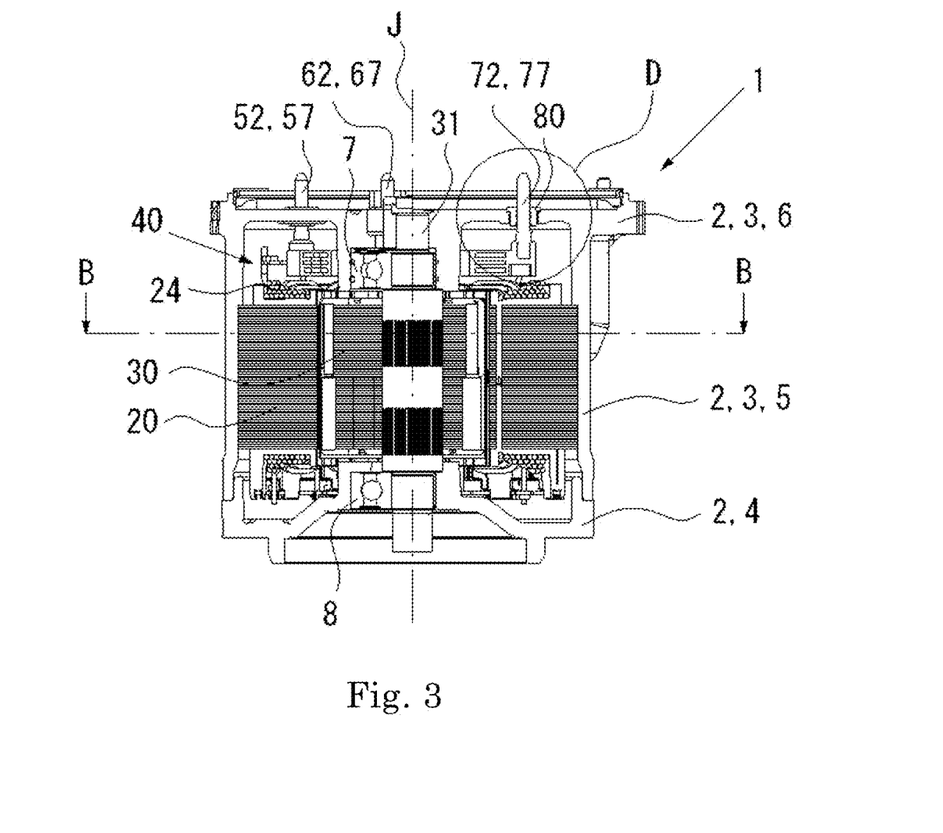
FIG. 3 is a cross-sectional view taken along line A-A in FIG. 2.

As illustrated in FIG. 3, the cylindrical body 3 includes a cylindrical portion 5 that extends in the axial direction and a bottom portion 6 that substantially closes one axial side of the cylindrical portion 5. The lid body 4 is attached to the other axial side of the cylindrical portion 5. The lid body 4 closes an opening provided in the cylindrical portion 5. Each portion of the housing 2 is molded, for example, by die casting of a metal material such as aluminum.

The motor 1 includes an annular stator 20 fixed to an inner circumferential surface of the cylindrical portion 5 and a rotor 30 arranged on the inner circumferential side of the stator 20.

A shaft 31 of the rotor 30 is pivotally supported on the housing 2 via a first bearing 7 held by the bottom portion 6 and a second bearing 8 held by the lid body 4. Therefore, the rotor 30 can rotate relative to the housing 2 and the stator 20. The axis J of the shaft 31 coincides with a central axis of the cylindrical portion 5. The motor 1 is a so-called inner rotor type motor. The bottom portion 6 corresponds to a bearing holder.

The shaft 31 has an output end on the lid body 4 side, and protrudes from the lid body 4 to the outside of the housing 2. The output end of the shaft 31 is connected to a vehicle steering system (not illustrated) outside the housing 2.

Figure 4:
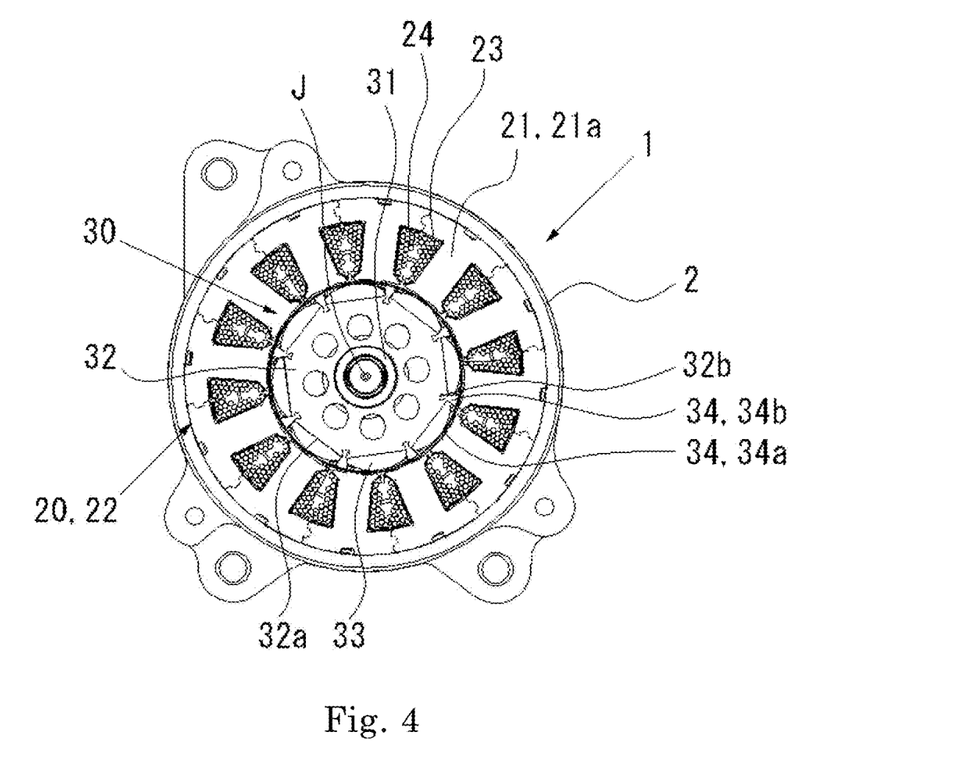
FIG. 4 is a cross-sectional view taken along line B-B in FIG. 3.

As illustrated in FIG. 4, the rotor 30 includes a rotor core 32, rotor magnets 33, and a holder 34.

The rotor core 32 is configured by stacking a plurality of electromagnetic steel plates in the axial direction. The rotor core 32 is formed in a substantially regular octagon when viewed from the axial direction. A rotary shaft 31 is fixed to the center of the rotor core 32 in the state viewed from the axial direction. The rotor core 32 has eight flat surfaces 32a on the outer circumference, and the rotor magnet 33 is arranged on each of the flat surfaces 32a. The rotor core 32 has a recessed holder groove 32b at a boundary between the flat surfaces 32a.

The eight rotor magnets 33 are provided at equal intervals in the circumferential direction on an outer circumferential surface of the rotor core 32. That is, the rotor 30 has eight poles.

The holder 34 has an annular portion 34a having an inner diameter slightly larger than an outer diameter of the rotor core 32 and eight axial portions 34b extending in the axial direction from the annular portion 34a.

The first axial portion 34b is press-fitted into the holder groove 32b. With this press-fitting, the rotor magnet 33 is fixed in the state of being sandwiched between the annular portion 34a and the rotor core 32.

As illustrated in FIG. 4, the stator core 22 constituting the stator 20 is configured by connecting twelve divided cores 21 arranged in an annular shape. Each of the divided cores 21 has a tooth 21a extending to the radially inner side. The respective teeth 21a are arranged at equiangular intervals in the circumferential direction.

Each of the teeth 21a is wound with a winding 24 with an insulator 23, which is an insulating member, interposed therebetween.

The twelve windings 24 are classified into a U-phase winding, a V-phase winding, and a W-phase winding. There are four U-phase windings, four V-phase windings, and four W-phase windings. The motor 1 is a three-phase AC motor.

The motor 1 includes a bus bar assembly 40 positioned between the stator 20 and the bottom portion 6 as illustrated in FIG. 3.

Figure 5:
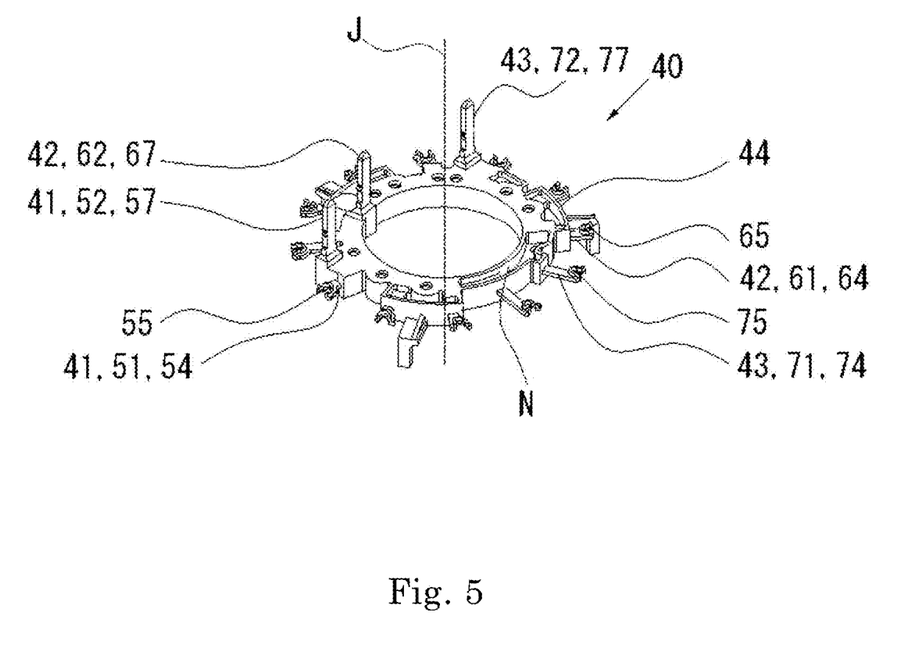
FIG. 5 is a perspective view of a bus bar assembly according to an example embodiment of the present disclosure.
Figure 6:
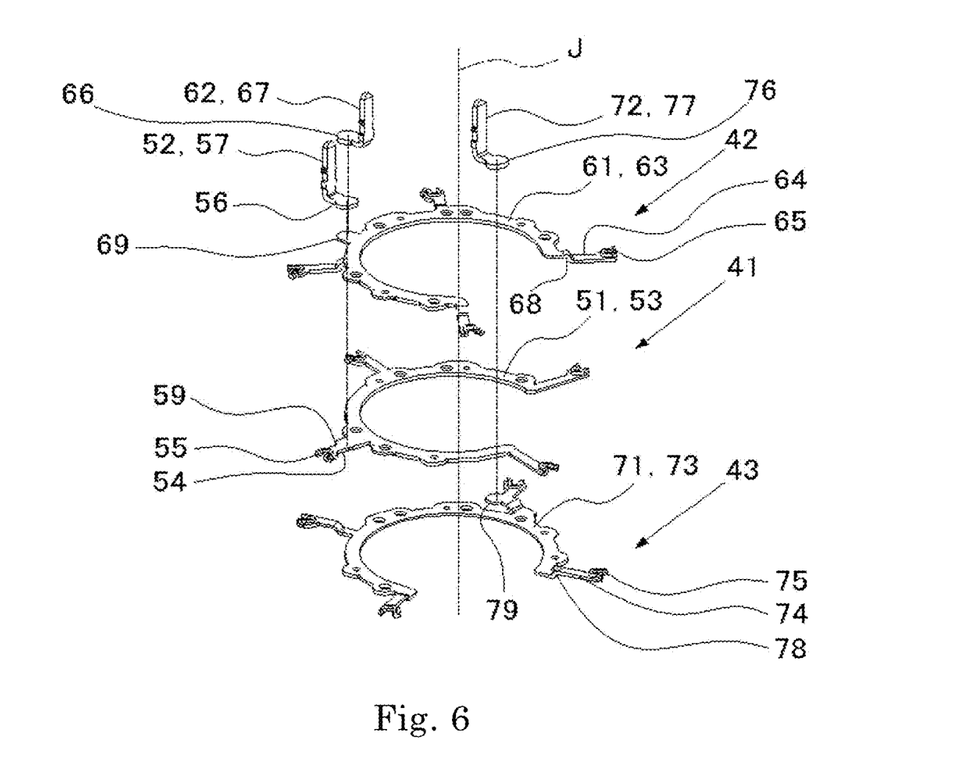
FIG. 6 is an exploded perspective view of a bus bar assembly according to an example embodiment of the present disclosure.

The bus bar assembly 40 includes a first bus bar 41, a second bus bar 42, and a third bus bar 43, which are arranged side by side in the axial direction, and a bus bar holder 44 that holds these three bus bars as illustrated in FIGS. 5 and 6. The first bus bar 41, the second bus bar 42, and the third bus bar 43 are, for example, plate-shaped members obtained by press-molding a metal member such as copper. For example, the first bus bar 41 is connected to each end of the U-phase windings. The second bus bar 42 is connected to each end of the V-phase windings. The third bus bar 43 is connected to each end of the W-phase windings. The three bus bars 41, 42, and 43 overlap with each other in the axial direction with respect to a plate thickness direction. That is, a base portion 53 overlaps with the other bus bars in the axial direction.

The first bus bar 41 has a first bus bar body 51 and a terminal piece 52 attached to the first bus bar body 51.

The first bus bar body 51 has the base portion 53 extending in an arc shape along the circumferential direction with respect to the axis J, and four connecting portions 54 extending from the base portion 53 toward the radially outer side. The first bus bar body 51 is, for example, a plate-shaped member obtained by press-molding a metal member such as copper. The plate thickness direction of the base portion 53 and the connecting portion 54 and a plate width direction of the connecting portion 54 coincide with the axial direction and the circumferential direction, respectively.

The four connecting portions 54 are provided at equiangular intervals in the circumferential direction. Distal end portions of the connecting portions 54 are configured as U-shaped connection ends 55 opposing each other in the plate width direction. The connection ends 55 are joined to the respective ends of the U-phase windings 24, for example. A joining method thereof is, for example, resistance welding.

The terminal piece 52 is, for example, a plate-shaped member obtained by press-molding a metal member such as copper. The terminal piece 52 gas a linking portion 56 extending in the radial direction and an exposed portion 57 extending from the linking portion 56 toward the one axial side. The linking portion 56 is joined to an attachment portion 59 formed on one of the four connecting portions 54. A joining method is, for example, welding. The attachment portion 59 is formed at a proximal end part of the connecting portion 54, and has a larger plate width than the other part of the connecting portion 54.

Figure 7:
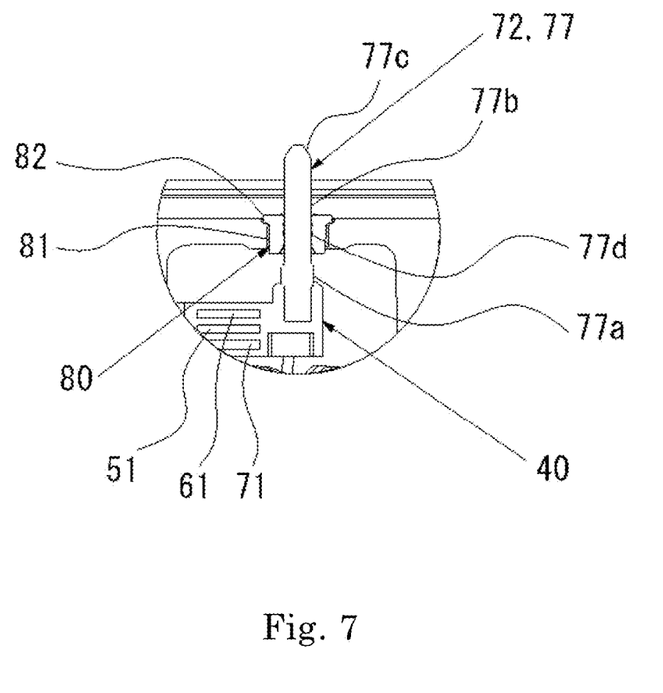
FIG. 7 is an enlarged view of a portion surrounded by a circle D in FIG. 3.

The exposed portion 57 is roughly divided into a proximal end portion 57a, an intermediate portion 57b, and a distal end portion 57c in order from the linking portion 56 side toward the one axial side as illustrated in FIGS. 6 and 7. The plate width direction of the exposed portion 57 substantially coincides with the radial direction.

The proximal end portion 57a has a larger plate width than the intermediate portion 57b and the distal end portion 57c.

Figure 8:
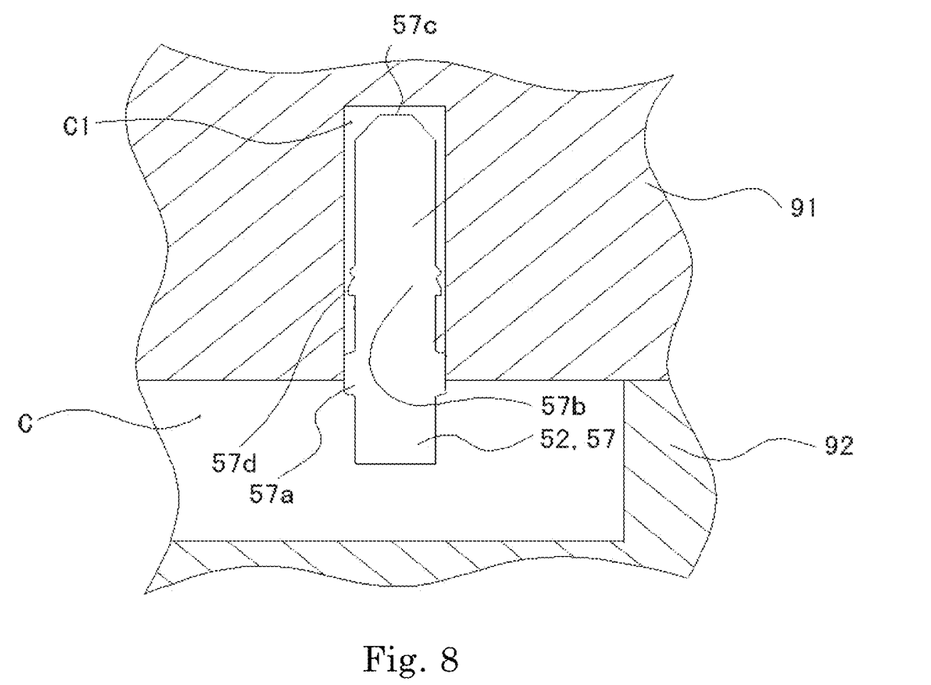
FIG. 8 is an enlarged cross-sectional view illustrating a manufacturing process of a bus bar assembly according to an example embodiment of the present disclosure.

As illustrated in FIG. 8, the intermediate portion 57b has protrusions 57d protruding from both edges in the plate width direction. A length, obtained by adding a protruding length of the protrusion 57d and a plate width of the intermediate portion 57b, does not exceed a plate width of the proximal end portion 57a.

The distal end portion 57c gradually becomes narrower toward the distal end.

Next, the second bus bar 42 will be described. The main differences between the second bus bar 42 and the first bus bar 41 are that a stepped portion is formed in a connecting portion and that an attachment portion is provided separately from the connecting portion. Thus, the configurations of the second bus bar 42 that correspond to those of the first bus bar 41 are illustrated by changing the tens place in the reference signs from "5" to "6", and the detailed description thereof are omitted.

As illustrated in FIG. 6, the second bus bar 42 is positioned on the one axial side of the first bus bar 41, that is, between the first bus bar 41 and the bottom portion 6. The second bus bar 42 is joined to, for example, each end of the V-phase winding 24 at a connection end 65.

The connecting portion 64 has a stepped portion 68 which is formed between a proximal end part and the connection end 65 and extends from the proximal end side to the other axial side, that is, to the first bus bar 41 side. In the axial direction, the stepped portion 68 extends up to a position where the first bus bar 41 is provided. Accordingly, the connection end 65 is positioned on the radially outer side of the first bus bar 41. That is, the connection end 65 is positioned at the same position as the connection end 55 in the axial direction. In other words, the connection end 65 is positioned on the distal end side of the stepped portion 68.

The attachment portion 69 is a part that protrudes to the radially outer side from the base portion 63, and is provided at a position different from the four connecting portions 64.

Next, the third bus bar 43 will be described. The main differences between the third bus bar 43 and the first bus bar 41 are that a stepped portion is formed in a connecting portion and that an attachment portion is provided at a position different from a proximal end part of the connecting portion. Thus, the configurations of the third bus bar 43 that correspond to those of the first bus bar 41 are illustrated by changing the tens place in the reference signs from "5" to "7", and the detailed description thereof are omitted.

As illustrated in FIG. 6, the third bus bar 43 is positioned on the other axial side of the first bus bar 41, that is, between the first bus bar 41 and the stator 20. The third bus bar 43 is joined to, for example, each end of the W-phase winding 24 at a connection end 75. The connecting portion 74 has a stepped portion 78 which is formed between a proximal end part and the connection end 75 and extends from the proximal end side to the one axial side, that is, to the first bus bar 41 side. In the axial direction, the stepped portion 78 extends up to a position where the first bus bar 41 is provided. Accordingly, the connection end 75 is positioned on the radially outer side of the first bus bar 41. That is, the connection end 75 is positioned at the same position as the connection ends 55 and 65 in the axial direction. In other words, the connection end 75 is positioned on the distal end side of the stepped portion 78.

An attachment portion 79 is formed between the stepped portion 78 of the connecting portion 74 and the connection end 75, and has a plate width set to be larger than the other part of the connecting portion 74. As illustrated in FIG. 5, the bus bar holder 44 is an insulating member molded in an annular shape. The bus bar holder 44 is molded in a state where the first bus bar 41, the second bus bar 42, and the third bus bar 43 are displaced from each other in the axial direction. That is, the first bus bar 41, the second bus bar 42, and the third bus bar 43 are kept in a non-contact state with each other.

Specifically, the bus bar holder 44 molds the base portions 53, 63, and 73, the attachment portions 59, 69, and 79, and the stepped portions 68 and 78 in the bus bar bodies 51, 61, and 71. The bus bar holder 44 molds the linking portions 56, 66, and 76 in the terminal pieces 52, 62, and 72. In addition, at least one of the at least two bus bars has the stepped portion extending toward the other bus bar between the proximal end and the distal end of the connecting portion.

Therefore, the connection ends 55, 65, and 75 protrude to the radially outer side from the bus bar holder 44. That is, the connection ends 55, 65, and 75 are exposed from the bus bar holder 44. The exposed portions 57, 67, and 77 in the terminal pieces 52, 62, and 72 protrude from the bus bar holder 44 to the one axial side. That is, the exposed portions 57, 67, and 77 are exposed from the bus bar holder 44. As illustrated in FIGS. 1 and 2, the terminal pieces 52 and 72 are arranged at positions where plate widths thereof coincide with each other. The terminal piece is arranged to be farther from the shaft 31 in the plate thickness direction than the terminal pieces 52 and 72. With these arrangements, the interference between the terminal piece 62 and the shaft 31 is suppressed. In addition, a heat sink H is provided on the radially outer side from the shaft 31 with respect to the terminal pieces 52, 62, and 72. As illustrated in FIG. 5, the bus bar holder 44 has a hollow portion N that is recessed in a surface on the one axial side and a surface on the other axial side.

As illustrated in FIG. 3, the exposed portions 57, 67, and 77 pass through the three through-holes 9 provided in the bottom portion 6, respectively, and protrude to the one axial side from a first closed portion 12. The distal end portions 57c, 67c, and 77c of the exposed portions 57, 67, and 77 are connected to a control unit (not illustrated). The control unit (not illustrated) supplies power to each of the windings 24 via the bus bar assembly 40.

In addition, terminal covers 80 are attached to the exposed portions 57, 67, and 77, respectively. The terminal cover 80 is molded using, for example, an elastically deformable resin. The terminal cover 80 corresponds to a bush. As illustrated in FIG. 7, the terminal cover 80 includes a cylindrical body 81 that extends in the axial direction, and a flange 82 that expands in the radial direction from an edge of one axial side of the cylindrical body 81. In the radial direction, the flange 82 is larger than the through-hole 7 and the cylindrical body 81 is smaller than the through-hole 7. The cylindrical body 81 is positioned inside the through-hole 7. The flange 82 closes one axial side of the through-hole 7. The protrusions 57d, 67d, and 77d bite into inner wall surfaces of the cylindrical bodies 81.

Next, a manufacturing process of the bus bar assembly 40 will be described. Note that the bus bar bodies 51, 61, and 71 and the terminal pieces 52, 62, and 72 are in the state of being integrated in advance.

As illustrated in FIG. 8, an upper mold 91 and a lower mold 92 that are relatively displaced in the axial direction are butted against each other to form a cavity C together. The cavity C is provided on the upper mold 91 side and has a terminal cavity C1 extending in the axial direction. An inner dimension of the terminal cavity C1 corresponding to a direction intersecting the axial direction, that is, the plate width direction of the exposed portion 57 is slightly larger than a plate width of the proximal end portion 57a. The terminal cavity C1 allows the exposed portion 57 to enter.

The first bus bar 41, the second bus bar 42, and the third bus bar 43 are set in the cavity C in a state where a region from an axially intermediate part of the proximal end portion 57a to the distal end portion 57c in the exposed portions 57, 67, and 77 enters the terminal cavity C1. The proximal end portion 57a of the part entering the terminal cavity C1 comes into contact with the upper mold 91 in the plate width direction. Note that the contact herein indicates a state where the resin is prevented from entering the terminal cavity C1 from between the proximal end portion 57a and the upper mold 91 while allowing the relative movement therebetween. The cavity C in which the first bus bar 41, the second bus bar 42, and the third bus bar 43 are set is filled with a molten resin, and the bus bar assembly 40 is manufactured by solidifying the resin. That is, the bus bar assembly 40 is manufactured by insert molding.

Next, operations and effects of the motor 1 will be described.

(1) The bus bar holder 44 molds the base portion 55 and the base portions 68 and 78 in a state where the connection end 55 is exposed. Therefore, it is unnecessary to arrange the base portion 55 and the base portions 68 and 78 to be separated from other conductive members. For example, the base portions 68 and 78 can be brought closer to the windings 24 wound around the teeth 21a. As a result, since the bus bar holder 44 can be brought into contact with the upper side of the stator 20, it is possible to suppress a size increase of the motor 1. It is also possible to obtain a secondary effect that the degree of freedom of the arrangement of the bus bar assembly 40 in the motor 1 is improved.

(2) Since the connection end 55 is provided at the distal end of the connecting portion 54, the connection end 55 is exposed and the winding 24 is easily wound. As a result, it is easy to manufacture the motor 1.

(3) The connecting portion 54 is provided on the radially outer side from the base portion 55. As a result, the bottom portion 6 functioning as a bearing holder can hold the first bearing 7 inside the bus bar holder 44 in the radial direction. As a result, it is possible to suppress a size increase of the motor 1 in the axial direction.

(4) The stepped portion 68 provided in the second bus bar 42 extends to the other axial side, that is, the first bus bar 41 side. The stepped portion 78 provided in the third bus bar 43 extends to the one axial side, that is, the first bus bar 41 side. Thus, axial positions of the connection ends 55, 65, and 75 provided in the three bus bars 41, 42, and 43 are constant. Therefore, it is easy to join each of the three bus bars 41, 42, and 43 and the corresponding winding 24.

(5) The plate width of the proximal end portion 57a of the exposed portion 57 is larger than the plate width of the distal end portion. As a result, the exposed portion 57 is easily inserted into the terminal cavity C1 of the mold. That is, each of the bus bars 41, 42, and 43 is easily set in the cavity C at the time of insert molding, it is easy to manufacture the bus bar assembly 40. As a result, it is easy to manufacture the motor 1. Since the plate width of the intermediate portion 57b including the protrusions 57d, 67d, and 77d is smaller than the plate width of the proximal end portion 57a, the exposed portion 57 can be more easily inserted into the terminal cavity C1.

(6) The terminal pieces 52, 62, and 72 protrude to the outside of the housing 2 through the through-hole 7, and the terminal covers 80 that close the through-hole 7 are attached. Since the terminal cover 80 is simply attached to the exposed portion 57, the manufacturing is easy. In addition, a foreign matter such as contamination can be prevented from entering the inside of the housing 2. Furthermore, it is also possible to ensure the insulation of the terminal pieces 52, 62, and 72 with respect to the housing 2 and other conductive members.

(7) The protrusion is provided in the intermediate portion 57b of the exposed portion 57. The protrusions 57d, 67d, and 77d bite into the inner wall surfaces of the cylindrical bodies 81. As a result, the terminal covers 80 are not easily displaced relative to the terminal pieces 52, 62, and 72.

A modification of the above example embodiment will be described.

The base portion 55 is not necessarily an arc shape.

Although the motor and bus bar assembly provided with the three bus bars have been described, it suffices that two or more bus bars are provided. Although the bus bar for the phase has been exemplified in the example embodiment, a bus bar for a neutral point may be used.

The bus bar assembly may be provided on one axial side of the bearing holder. That is, the bearing holder may be positioned between the bus bar assembly and the stator in the axial direction.

The plate widths of the intermediate portions 57b, 67b, and 77b including the protrusions 57d, 67d, and 77d are preferably equal to or smaller than the plate widths of the proximal end portions 57a, 67a, and 77a. Even in such a configuration, the exposed portions 57, 67, and 77 can enter the terminal cavity C1.

Each portion of the housing 2 may be manufactured by a manufacturing method other than die casting such as pressing.

Although an 8-pole 12-slot motor has been exemplified in the above example embodiment, other combinations of the number of poles and the number of slots may be adopted.

The cylinder portion and the bottom portion may be separate bodies.

The bus bar may be manufactured by a manufacturing method other than pressing.

The housing may be manufactured using a material other than the metal material, for example, a resin or the like.

The motor may be used in a device other than the electric power steering device.

Each direction described in the above example embodiment is used for the description, and do not limit attitudes of the motor, such as an attachment position to a device.

The above example embodiment and modifications may be combined with each other within a scope having no technical contradiction.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A bus bar assembly comprising:
at least two bus bars; and
a bus bar holder made of an insulating material and holding the at least two bus bars; wherein
at least one of the at least two bus bars includes a base portion that overlaps with another of the at least two bus bars in an axial direction, and a connecting portion that extends from the base portion along a radial direction;
at least one of the at least two bus bars includes a stepped portion that extends toward another one of the at least two bus bars between a proximal end and a distal end of the connecting portion;
the bus bar holder is molded about the base portion and the stepped portion such that the distal end is exposed;
the connecting portion includes a connection end which is exposed from the bus bar holder and connected to a winding;
the connection end is positioned on a distal end side of the stepped portion;
the at least two bus bars include a first bus bar, a second bus bar positioned on one axial side of the first bus bar, and a third bus bar positioned on another axial side of the first bus bar;
the stepped portion provided in the second bus bar extends to the other axial side; and
the stepped portion provided in the third bus bar extends to the one axial side.

2. A motor comprising:
a bus bar assembly, including:
at least two bus bars; and
a bus bar holder made of an insulating material and holding the at least two bus bars; wherein
at least one of the at least two bus bars includes a base portion that overlaps with another of the at least two bus bars in an axial direction, and a connecting portion that extends from the base portion along a radial direction;

at least one of the at least two bus bars includes a stepped portion that extends toward another one of the at least two bus bars between a proximal end and a distal end of the connecting portion;

the bus bar holder is molded about the base portion and the stepped portion such that the distal end is exposed;

the connecting portion includes a connection end which is exposed from the bus bar holder and connected to a winding;

the connection end is positioned on a distal end side of the stepped portion;

the at least two bus bars include a first bus bar, a second bus bar positioned on one axial side of the first bus bar, and a third bus bar positioned on another axial side of the first bus bar;

the stepped portion provided in the second bus bar extends to the other axial side; and the stepped portion provided in the third bus bar extends to the one axial side;

a housing extending in an axial direction;

a stator fixed to an inner circumferential surface of the housing; and a rotor positioned inside the stator; wherein the bus bar assembly is positioned between the stator and a bearing holder that rotatably supports the rotor with respect to the housing in the axial direction.

3. The motor according to claim 2, wherein the bearing holder holds a bearing inside the bus bar assembly in a radial direction.

* * * * *